(12) United States Patent
Yang

(10) Patent No.: US 12,521,044 B2
(45) Date of Patent: Jan. 13, 2026

(54) HIGHLY INTEGRATED INTELLIGENT ANALYTE DETECTION DEVICE

(71) Applicant: MEDTRUM TECHNOLOGIES INC., Shanghai (CN)

(72) Inventor: Cuijun Yang, Shanghai (CN)

(73) Assignee: MEDTRUM TECHNOLOGIES INC., Shanghai (CN)

( * ) Notice: Subject to any disclaimer, the term of this patent is extended or adjusted under 35 U.S.C. 154(b) by 733 days.

(21) Appl. No.: 17/800,218

(22) PCT Filed: Jul. 7, 2020

(86) PCT No.: PCT/CN2020/100601
§ 371 (c)(1),
(2) Date: Aug. 16, 2022

(87) PCT Pub. No.: WO2021/164184
PCT Pub. Date: Aug. 26, 2021

(65) Prior Publication Data
US 2023/0066019 A1 Mar. 2, 2023

(30) Foreign Application Priority Data
Jul. 7, 2020 (WO) ................ PCT/CN2020/075966

(51) Int. Cl.
*A61B 5/145* (2006.01)
*A61B 5/00* (2006.01)
(Continued)

(52) U.S. Cl.
CPC ........ *A61B 5/14532* (2013.01); *A61B 5/0002* (2013.01); *A61B 5/002* (2013.01);
(Continued)

(58) Field of Classification Search
CPC ............ A61B 5/14532; A61B 2562/16; A61B 2562/22
See application file for complete search history.

(56) References Cited

U.S. PATENT DOCUMENTS

2007/0073129 A1\* 3/2007 Shah ................... A61B 5/6849
600/347
2010/0277119 A1\* 11/2010 Montague ............. H02J 7/0042
600/301
(Continued)

FOREIGN PATENT DOCUMENTS

| CN | 201522508 | 7/2010 |
|----|-----------|--------|
| CN | 107361775 | 11/2017 |

(Continued)

OTHER PUBLICATIONS

"International Search Report (Form PCT/ISA/210) of PCT/CN2020/100601," mailed on Nov. 23, 2020, with English translation thereof, pp. 1-2.

*Primary Examiner* — Christian Jang
(74) *Attorney, Agent, or Firm* — JCIP GLOBAL INC.

(57) ABSTRACT

A highly integrated intelligent analyte detection device, includes: a bottom case including a first connection region; a transmitter including a transmitter case and an internal circuit, the internal circuit including at least two second electrical connection ends and at least two first electrical connection ends, at least two first electrical connection ends electrically conductive; a sensor including a signal output portion and a detection portion, and the signal output portion provided with at least two third electrical connection ends; and a second connection region including at least two conductive areas and at least one insulation area, and at least two third electrical connection ends respectively electrically connected to the corresponding second electrical connection ends, reducing the complexity of internal structure in the (Continued)

device and the size of the device, thus enhancing the user experience.

21 Claims, 9 Drawing Sheets

(51) Int. Cl.
*A61B 5/1468* (2006.01)
*A61B 5/1473* (2006.01)
*A61M 5/158* (2006.01)
*A61M 5/172* (2006.01)
*B01L 3/00* (2006.01)
*H01M 50/247* (2021.01)
*H01M 50/271* (2021.01)

(52) U.S. Cl.
CPC ........ *A61B 5/14503* (2013.01); *A61B 5/1451* (2013.01); *A61B 5/14546* (2013.01); *A61B 5/1468* (2013.01); *A61B 5/1473* (2013.01); *A61B 5/683* (2013.01); *A61B 5/6838* (2013.01); *A61B 5/6848* (2013.01); *A61B 5/6849* (2013.01); *A61M 5/158* (2013.01); *A61M 5/1723* (2013.01); *B01L 3/502715* (2013.01); *B01L 3/505* (2013.01); *B01L 3/508* (2013.01); *H01M 50/247* (2021.01); *H01M 50/271* (2021.01); *A61B 2560/0214* (2013.01); *A61B 2560/045* (2013.01); *A61B 2560/0462* (2013.01); *A61B 2560/0468* (2013.01); *A61B 2562/16* (2013.01); *A61B 2562/225* (2013.01); *A61B 2562/227* (2013.01); *A61M 2205/0216* (2013.01); *A61M 2205/0233* (2013.01); *B01L 2200/0689* (2013.01); *B01L 2300/023* (2013.01); *B01L 2300/0609* (2013.01); *B01L 2300/0645* (2013.01); *B01L 2300/0663* (2013.01); *B01L 2300/123* (2013.01); *B01L 2400/0677* (2013.01)

(56) References Cited

U.S. PATENT DOCUMENTS

| | | | |
|---|---|---|---|
| 2015/0051457 A1* | 2/2015 | Matsumoto | A61B 5/14503 702/183 |
| 2016/0124017 A1* | 5/2016 | Shi | G01R 1/06733 324/755.02 |
| 2017/0290532 A1* | 10/2017 | Antonio | A61M 5/1723 |
| 2021/0398662 A1* | 12/2021 | Strom | G06F 16/951 |

FOREIGN PATENT DOCUMENTS

| | | |
|---|---|---|
| CN | 109998555 | 7/2019 |
| EP | 3278729 | 2/2018 |
| EP | 3397142 | 11/2018 |
| WO | 2018027940 | 2/2018 |

* cited by examiner

HIGHLY INTEGRATED INTELLIGENT ANALYTE DETECTION DEVICE

CROSS-REFERENCE TO RELATED APPLICATION

This application is a 371 of international application of PCT application serial no. PCT/CN2020/100601, filed on Jul. 7, 2020, which claims the priority benefit of PCT application serial no. PCT/CN2020/075966, filed on Feb. 20, 2020. The entirety of each of the above-mentioned patent applications is hereby incorporated by reference herein and made a part of this specification.

TECHNICAL FIELD

The present invention mainly relates to the field of medical device, and in particular, to a highly integrated intelligent analyte detection device.

BACKGROUND

The pancreas in a normal person can automatically monitor the amount of glucose in the blood and automatically secrete the required dosage of insulin/glucagon. However, for diabetic patients, the function of the pancreas is abnormal, and the pancreas cannot normally secrete required dosage of insulin. Therefore, diabetes is a metabolic disease caused by abnormal pancreatic function and also a lifelong disease. At present, there is no cure for diabetes, but the onset and development of diabetes and its complications can be controlled by stabilizing blood glucose.

Patients with diabetes need to check their blood glucose before injecting insulin into the body. At present, many detection devices can continuously detect blood glucose, and send the blood glucose data to the remote device in real time for the user to view. This detection method is called Continuous Glucose Monitoring (CGM). The method requires the detection device to be attached to the surface of the patient's skin, and the sensor of the device to be inserted into the subcutaneous tissue fluid for testing.

However, the current detection device is not compact, resulting in greater thickness and larger volume, affecting the user's dressing, stretching, exercise and other daily activities, which can seriously worsen user experience. Also, glucose monitoring can be easily interrupted with such a detection device because a bulky device can get bumped or caught easily, which may lead to data loss and pose a potential safety hazard to the user. And the detection device is not intelligent enough.

Accordingly, there is a need in the state of the art for a highly integrated intelligent analyte detection device with relatively simple internal structure and smaller volume.

BRIEF SUMMARY OF THE INVENTION

The embodiment of the present invention discloses a highly integrated intelligent analyte detection device. The connection member provided between the sensor and the transmitter includes a conductive area and an insulation area. The connection member simultaneously performs conduction and insulation, reducing the complexity of internal structure in the device and the size of the device, thus enhancing the user experience. At the same time, the electrical conduction of at least two first electrical connection ends triggers a signal of the transmitter to intelligently control the detection device to work.

The invention discloses a highly integrated intelligent analyte detection device, including: a bottom case, a first connection region including the conductive portion is disposed on the bottom case; a transmitter including a transmitter case and an internal circuit, the internal circuit, arranged in the transmitter case, includes at least two second electrical connection ends and at least two first electrical connection ends which are insulated from each other and are corresponding to the first connection region, and through the electrical connection with the first connection region, at least two first electrical connection ends are electrically conductive, triggering a signal; a sensor, assembled on the bottom case, includes a signal output portion and a detection portion, and the signal output portion is provided with at least two third electrical connection ends corresponding to the second electrical connection ends; and a second connection region, arranged between the third electrical connection ends and the second electrical connection ends, includes at least two conductive areas and at least one insulation area which cannot be separated from each other, and the insulation area is provided between two adjacent conductive areas, and at least two third electrical connection ends, through different conductive areas, are respectively electrically connected to the corresponding second electrical connection ends, and the different third electrical connection ends or the different second electrical connection ends are respectively electrically connected to the different conductive areas.

According to an aspect of the present invention, the first electrical connection ends or the second electrical connection ends are metal contact pins.

According to an aspect of the present invention, the first electrical connection ends or the second electrical connection ends are protruding metal contact pins with spherical top.

According to one aspect of the present invention, the first connection region or the second connection region is provided with concave portions that correspondingly cooperate with the protruding spherical tops of the protruding metal contact pins.

According to an aspect of the present invention, the first electrical connection ends or the second electrical connection ends are provided inside the transmitter, and the first connection region is provided with protrusions that cooperate with the first electrical connection ends, or the second connection region is provided with protrusions that cooperate with the second electrical connection ends.

According to an aspect of the present invention, the second electrical connection ends are protruding plugs.

According to an aspect of the present invention, the second connection region is provided with ports that cooperate with the protruding plugs.

According to an aspect of the present invention, the conductive area and the insulation area expand across the second connection region in the vertical direction, respectively.

According to an aspect of the present invention, the third electrical connection ends and the corresponding second electrical connection ends share a common part of the conductive area.

According to an aspect of the invention, the common part of the conductive area includes a portion of one conductive area, or one conductive area, or more than one conductive area.

According to an aspect of the present invention, the insulation area is spaced between any two third electrical connection ends or any two second electrical connection ends connected to the second connection region, and the spaced insulation area includes a portion of one insulation area, or one insulation area, or more than one insulation area.

According to an aspect of the present invention, when the transmitter is assembled to the bottom case, a short circuit occurs in the internal circuit, therefore, the type of the signal is a short-circuit electrical signal.

According to an aspect of the present invention, the signal includes a start detecting signal or a stop detecting signal.

According to an aspect of the present invention, the presentation of the signal is one or a combination of ordinary electrical signals, luminous signals, vibration signals, and sound signals.

According to an aspect of the present invention, when the transmitter is not assembled on the bottom case, at least two first electrical connection ends can be electrically connected to an external power source to charge the transmitter.

According to an aspect of the present invention, the first connection region is the first elastic connection region, or the second connection region is the second elastic connection region.

According to an aspect of the present invention, the first connection region and the second connection region is disposed in the same connection member.

According to an aspect of the present invention, the connection member is an elastic connection member surrounding the positions where the first elastic connection region and the first electrical connection ends are electrically connected, or surrounds the positions where the second elastic connection region connects with the second electrical connection ends and the third electrical connection ends, respectively.

According to an aspect of the present invention, the third electrical connection ends are embedded inside the second connection region.

According to an aspect of the present invention, the different third electrical connection ends are independent of each other and do not interfere with each other, and the embedding heights of the third electrical connection ends in the second connection region are not exactly the same.

According to an aspect of the present invention, the insulation portion is also included in the first connection region, and the insulation portion and conductive portion are arranged alternately.

According to an aspect of the present invention, the two first electrical connection ends connected with the conductive portion share a common part of the conductive portion.

Compared with the prior art, the technical solution of the present invention has the following advantages:

In the highly integrated intelligent analyte detection device disclosed in the present invention, the second connection region, disposed between the third electrical connection ends and the second electrical connection ends, includes at least two conductive areas and at least one insulation area which cannot be separated from each other, and the insulation area is provided between two adjacent conductive areas. Both conductive area and insulation area are disposed in a single second connection region, thereby equipping one second connection region with functions of both conduction and insulation. Therefore, the number of internal components of the detection device is reduced, making the internal structure of the detection device more compact, improving the integration of the detection device, and reducing the size of the detection device, which enhances the user experience. In addition, at least two third electrical connection ends, through different conductive areas, are respectively electrically connected to the corresponding second electrical connection ends. When more than two third electrical connection ends and second electrical connection ends are provided in the detection device, one or some of the third electrical connection ends are electrically connected to the corresponding second electrical connection ends by other means, which increases the flexibility of the electrical connection in the device. Thirdly, a first connection region including the conductive portion is disposed on the bottom case, and the internal circuit includes at least two first electrical connection ends which are insulated from each other, and through the electrical connection with the first connection region, at least two first electrical connection ends are electrically conductive, triggering a signal. The transmitter automatically sends out a signal to facilitate user identification and confirmation. At the same time, the transmitter can automatically control whether the detection device works, making the detection device more intelligent.

Furthermore, the first connection region or the second connection region is provided with concave portions that that correspondingly cooperate with the protruding spherical tops of the protruding metal contact pins. This design also helps fixing the position of the first connection region or the second connection region, that is, no matter what external force the detection device is subjected to, the position of the first connection region or the second connection region is always fixed and no displacement occurs.

Furthermore, the third electrical connection end and the corresponding second electrical connection end share a common part of the conductive area. The common part of the conductive area includes more than one conductive area. When the number of conductive areas is large or the range is increased, the reliability of the electrical connection between the structures will be significantly improved.

Furthermore, more than one insulation area is spaced between any two third electrical connection ends or any two second electrical connection ends connected to the second connection region. When the number of insulation areas is large or the range is increased, the reliability of electrical insulation between structures is also significantly improved.

Furthermore, when the transmitter is assembled to the bottom case, a short circuit occurs in the internal circuit, and the type of the signal is a short-circuit electrical signal. It is relatively simple to set up a short circuit in the internal circuit, thus reducing production costs.

Furthermore, the signal includes a start detecting signal or a stop detecting signal. The transmitter is equipped with an automatic identification module. Therefore, the transmitter automatically controls whether to start or stop the detection according to the signal, making the detection device more intelligent.

Furthermore, the presentation of the signal is one or a combination of ordinary electrical signals, luminous signals, vibration signals, and sound signals. When the signal is presented in a certain form, it is easier for the user to identify the content or instruction represented by the signal, thus the user can take timely countermeasures.

Furthermore, when the transmitter is not assembled on the bottom case, at least two first electrical connection ends can be electrically connected to an external power source to charge the transmitter. The rechargeable transmitter increases the service life of the transmitter and saves the user's cost. Secondly, at least two first electrical connection ends can be used not only for charging but also for triggering signals, optimizing the structural design of the detection device.

Furthermore, the first connection region is the first elastic connection region, or the second connection region is the second elastic connection region. The elastic connection region will be deformed under pressure, which helps obtain better electrical contact, and the elastic connection region can work as a buffer at the same time.

Furthermore, the different third electrical connection ends are independent of each other and do not interfere with each other, and the embedding heights of the third electrical connection ends in the second connection region are not exactly the same. In the actual manufacturing process, the thickness of each third electrical connection end will be different. When the transmitter is connected to the sensor, the independent and non-interfering third electrical connection ends can reduce or eliminate the effect of poor contact caused by the above thickness difference, which improves the reliability of the electrical connection among the second connection region, the third electrical connection ends and the second connection ends.

BRIEF DESCRIPTION OF THE DRAWINGS

FIG. 6a is a top view, and FIG. 6b is a side view of the structure in FIG. 6a;

FIG. 9b is a cross-sectional view of the elastic connection member taken along the section line A-A' in FIG. 9a;

FIG. 9d is a cross-sectional view taken along the section line B-B' in FIG. 9c;

FIG. 10b is a cross-sectional view taken along the section line C-C' in FIG. 10a;

FIG. 11b is a cross-sectional view taken along the section line D-D' in FIG. 11a;

FIG. 12b is a schematic diagram of the second connection region and the signal output portion matched with the second electrical connection ends in FIG. 12a.

DETAILED DESCRIPTION

Figure 1:
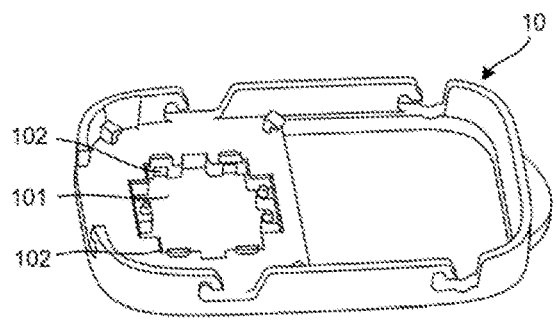
FIG. 1 is a schematic diagram of a bottom case according to an embodiment of the present invention.

As mentioned above, the body fluid parameter detection device of the prior art, with a large volume, can get easily bumped or caught when attached on the skin surface, which worsens user experience and brings inconvenience to the patient's life. And the device is not intelligent enough.

According to research, it is found that the above-mentioned problems are caused by the multiple conductive components between the transmitter and the sensor, and additional insulation components provided to separate adjacent conductive components. The internal structure of the detection device is complicated and not compact enough, resulting in lower integration and larger volume of the detection device.

In order to solve this problem, the present invention provides a highly integrated intelligent analyte detection device, and the connection member provided between the sensor and the transmitter includes the conductive area and the insulation area. The connection member performs both conduction and insulation, reducing the complexity of internal structure in the device and the size of the device, thus enhancing the user experience. At the same time, the electrical conduction of at least two first electrical connection ends triggers a signal of the transmitter to intelligently control the detection device to work.

Various exemplary embodiments of the present invention will now be described in detail with reference to the drawings. The relative arrangement of the components and the steps, numerical expressions and numerical values set forth in the embodiments are not to be construed as limiting the scope of the invention.

In addition, it should be understood that, for ease of description, the dimensions of the various components shown in the figures are not necessarily drawn in the actual scale relationship, for example, the thickness, the width, the length or the distance of certain units may be exaggerated relative to other structures.

The following description of the exemplary embodiments is merely illustrative, and is not intended to be in any way limiting the invention and its application or use. The techniques, methods and devices that are known to those of ordinary skill in the art may not be discussed in detail, but such techniques, methods and devices should be considered as part of the specification.

It should be noted that similar reference numerals and letters indicate similar items in the following figures. Therefore, once an item is defined or illustrated in a drawing, it will not be discussed further in following description of the drawings.

FIG. 1 is a schematic diagram of a bottom case 10 according to the embodiment of the present invention.

The bottom case 10 is used to assemble the sensor 113 and the transmitter 12. In the embodiment of the present invention, the bottom board of the bottom case 10 is provided with an assembly hole 101 for assisting the installation of the sensor 113, and a first fastening structure 102 is provided around the assembly hole 101 to help fasten the sensor 113 on the bottom case 10. The side wall of the bottom case 10 is further provided with a fastening portion (not labeled) for fixing the transmitter 12.

In another embodiment of the present invention, the bottom case 10 has only one side wall for fitting the sensor 113. A fastening portion for fixing the transmitter 12 is provided on the bottom board of the bottom case 10, and the transmitter 12 is installed on the bottom case 10 by sliding or other means.

In other embodiments of the present invention, the bottom case 10 may have other different shapes, as long as the condition for fixing the transmitter 12 on the bottom case 10 can be satisfied, which is not specifically limited herein.

Figure 2:
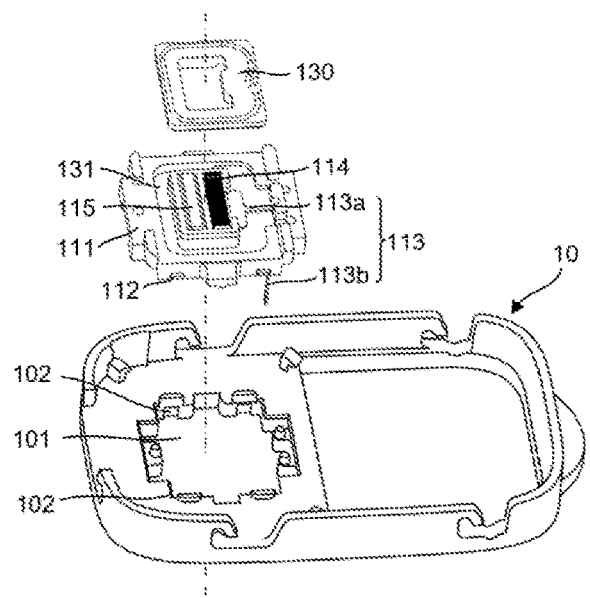
FIG. 2 is a schematic diagram of the assembly of a sensor and a bottom case according to an embodiment of the present invention.

FIG. 2 is a schematic diagram of the assembly of the sensor 113 and the bottom case 10 according to the embodiment of the invention.

In the embodiment of the present invention, the sensor 113, carried by the auxiliary assembly structure 111, is assembled on the bottom case 10, and the second fastening structure 112 is provided around the auxiliary assembly structure 111. The second fastening structure 112 and the first fastening structure 102 are fastened with each other to install the auxiliary assembly structure 111 in the assembly hole 101, thus assembling the sensor 113 on the bottom case 10. Therefore, in the embodiment of the present invention, the auxiliary assembly structure 111 is a part of the bottom case 10.

In another embodiment of the present invention, after the sensor 113 is assembled on the bottom case 10, the auxiliary mounting structure of the sensor 113 is removed, which means the sensor 113 is directly assembled on the bottom case 10 without the support of the auxiliary assembly structure 111 or other supporting structures. For example, the sensor 113 is assembled on one side of the bottom case 10 and is attached to the above-mentioned side wall of the bottom case 10.

In other embodiments of the present invention, the sensor 113 may also be assembled on the bottom case 10 using other assembly methods, which is not specifically limited herein.

Referring to FIG. 2, the sensor 113 includes a signal output portion 113a and a detection portion 113b. The signal output portions 113a need to be electrically connected to the second electrical connection ends 122 of the transmitter 12 to transmit the detection signal to the transmitter 12. The detection portion 113b is used to penetrate the subcutaneous tissue of the human body to detect the analyte parameter.

The signal output portion 113a is provided with the third electrical connection ends 116. Generally, the sensor 113 is further provided with electrodes and/or electrode leads (not labeled here and below) for detecting or transmitting the analyte parameter. The detection signal of the electrode is transmitted through the third electrical connection ends 116.

It should be noted that the embodiment of the present invention does not limit the arrangement method of the third electrical connection ends 116 on the signal output portion 113a. For example, the third electrical connection ends 116 may be disposed on the surface of the signal output portion 113a or embedded in the signal output portion 113a.

Generally, at least two detection electrodes are provided on the sensor 113, that is, the sensor 113 at least includes a working electrode and a counter electrode. Therefore, in the embodiment of the present invention, at least two third electrical connection ends 116 are provided on the surface of the signal output portion 113a to be electrically connected to different electrodes. Preferably, in the embodiment of the present invention, the sensor 113 is a three-electrode system. Therefore, the number of the third electrical connection ends 116 is three.

As depicted in FIG. 2, in the embodiment of the present invention, the sensor 113 is curved. The signal output portion 113a is attached to the surface of the auxiliary assembly structure 111 or embedded in the auxiliary assembly structure 111, which reduces the height of the part of the sensor 113 protruding from the bottom case 10, and thus reduces the thickness of the detection device.

In other embodiments of the present invention, the sensor 113 may also have other shapes or forms (such as non-curved), which is not specifically limited herein.

The first connection region 115 is disposed on the auxiliary assembly structure 111 of the bottom case 10 to conduct at least two first electrical connection ends 123, thus triggering a signal, which will be described in detail below.

Preferably, in the embodiment of the present invention, the second connection region 114 is also disposed on the auxiliary assembly structure 111 of the bottom case 10. The second connection region 114 is used to electrically connect the second electrical connection ends 122 and the third electrical connection ends 116, which will be described in detail below.

Therefore, in the embodiment of the present invention, the first connection region 115 corresponds to the first electrical connection ends 123, while the second connection region 114 corresponds to the second electrical connection ends 122 and the third electrical connection ends 116.

It should be noted that, according to the positions of the second electrical connection ends 122 and the third electrical connection ends 116, the first connection region 115 and the second connection region 114 may also be correspondingly disposed at other positions of the bottom case 10. There are no specific restrictions herein. In another embodiment of the present invention, the second connection region 114 may also be disposed on the transmitter 12.

Figure 3:
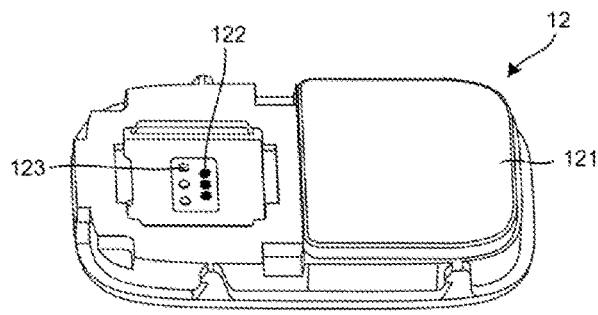
FIG. 3 is a schematic diagram of a transmitter according to an embodiment of the present invention.

FIG. 3 is a schematic diagram of a transmitter 12 according to an embodiment of the present invention.

The transmitter 12 is used to transmit the detection signal, received from the sensor 113, to a remote device in a wireless way.

The transmitter 12 includes a transmitter case 121 and internal circuits (not depicted). Preferably, in the embodiment of the present invention, the internal circuit is arranged on a PCB (Printed Circuit Board) located inside the transmitter case 121. In another embodiment of the present invention, the internal circuit is directly arranged in the transmitter case 121, which means the internal circuit is capsulized in the transmitter case 121.

In one embodiment of the present invention, the internal circuit further includes a battery circuit which is used to charge the battery in the transmitter 12.

The internal circuit includes at least two first electrical connection ends 123 insulated from each other and at least two second electrical connection ends 122.

In the embodiment of the present invention, the first electrical connection ends 123 are used to trigger a signal and charge the transmitter 12, which will be described in detail below. There must be at least two first electrical connection ends 123 in order to trigger a signal or charge the transmitter 12. When the transmitter 12 is not installed on the bottom case 10, any two first electrical connection ends 123 are insulated from each other to ensure that the transmitter 12 does not trigger a signal. The first electrical connection ends 123 correspond to the first connection region 115. Here, that the first electrical connection ends 123 corresponds to the first connection region 115 means that the positions of the two correspond.

The second electrical connection ends 122 are used to electrically connect with the third electrical connection ends 116, and thus receive the electrical signal from the sensor 113. Therefore, the second electrical connection ends 122 correspond to the third electrical connection ends 116. Here, the correspondence means that these two are equal in number and their positions basically correspond. Obviously, in the embodiment of the present invention, the number of the second electrical connection ends 122 is three, to be compatible with the three-electrode system of the sensor 113.

In the embodiment of the present invention, the second electrical connection ends 122 are exposed and protrude from the transmitter case 121 so as to make electrical contact with the corresponding third electrical connection ends 116. Preferably, in the embodiment of the present invention, the second electrical connection ends 122 are metal contact pins. The small size of the metal contact pins make the internal structure of the detection device more compact, thereby reducing the volume of the detection device.

It should be noted that the embodiment of the present invention does not limit the shape and position of the second electrical connection ends 122, and the positional relationship between the second electrical connection ends 122 and the transmitter case 121. As in one embodiment of the present invention, the second electrical connection ends are disposed on one side of the transmitter, so the electrical connection position of the connection member with the first electrical connection ends and the second electrical connection ends is located on one side of the detection device. In another embodiment of the present invention, the second electrical connection ends are flush with the surface of the transmitter case 121 instead of protruding from it. In still another embodiment of the present invention, the second electrical connection ends 122 are located inside the transmitter case 121, which will be described in detail below. As in yet another embodiment of the present invention, the cross section of the second electrical connection ends is rectangular or circular. In still another embodiment of the present invention, the conductive portion of the second electrical connection ends 122 is coated or plated on the surface of some plugs, or the second electrical connection ends 122 themselves are the plugs. The plugs can be inserted into the connection member, which will be described in detail below.

Similarly, the shape and position of the first electrical connection ends 123 and the positional relationship with the transmitter case 121 may also be similar to those of the second electrical connection ends 122, which will not be repeated here.

Figure 4:
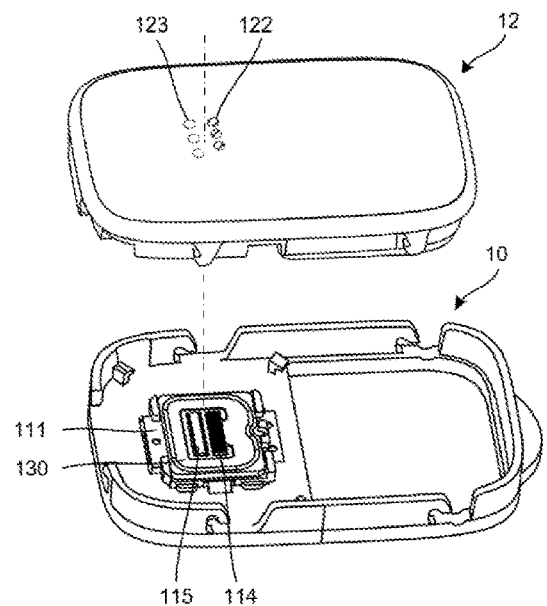
FIG. 4 is a schematic diagram of the assembly structure of the transmitter, the sensor, and the bottom case according to an embodiment of the present invention.

FIG. 4 is a schematic diagram of the assembly structure of the transmitter 12, the sensor 113, and the bottom case 10.

As shown in FIG. 4, the first electrical connection ends 123 are connected to the first connection region 115, and the second electrical connection ends 122 are electrically connected to the third electrical connection ends 116 through the second connection region 114. The above-mentioned shape, position, function and connection relationship will be described separately below.

Figure 5A:
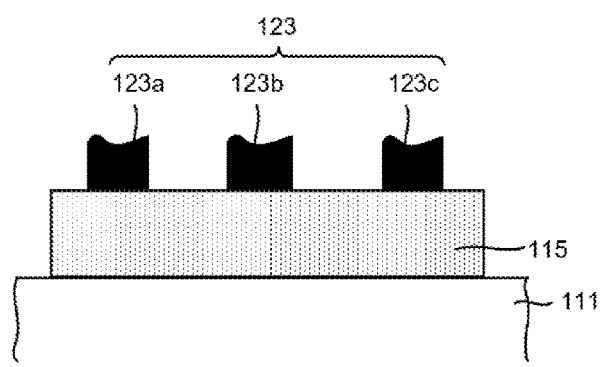
FIG. 5a-FIG. 5d are schematic diagrams of the first electrical connection ends and the first connection region interconnected according to different embodiments of the present invention.
Figure 5B:
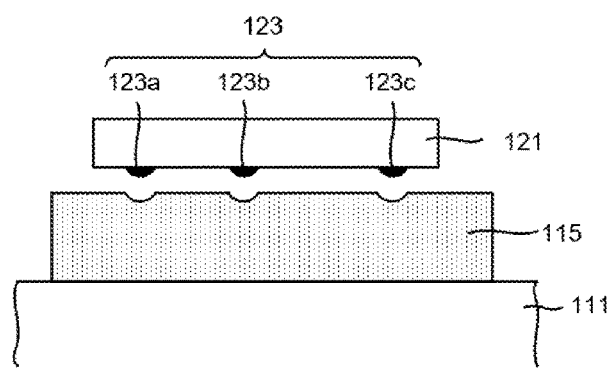
Figure 5C:
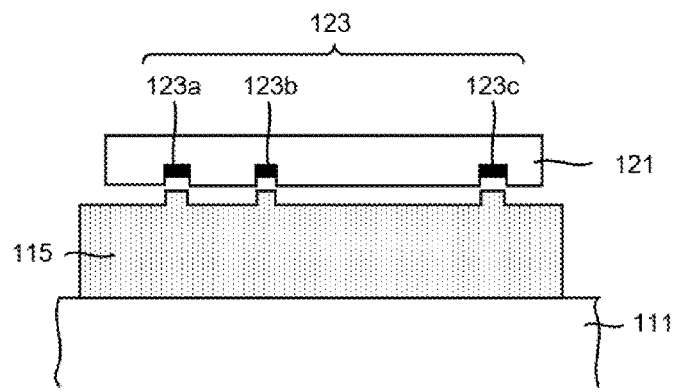
Figure 5D:
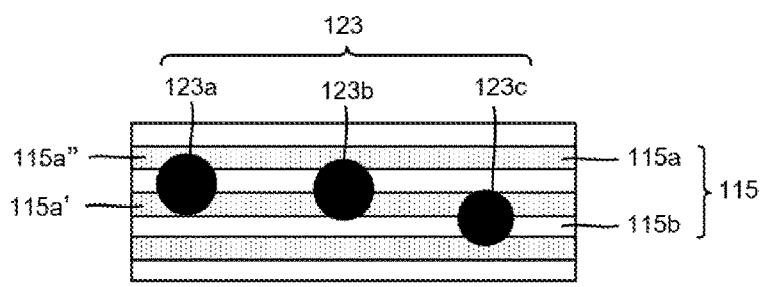

FIG. 5a-FIG. 5d are schematic diagrams of the first electrical connection ends 123 and the first connection region 115 interconnected in different embodiments of the present invention. FIG. 5d is a top view.

As shown in FIG. 5a, in one embodiment of the present invention, the first electrical connection ends 123 protrude out of the transmitter case 121 and are electrically connected to the conductive portion 115a of the first connection region 115 that is a rectangular metal conductor. The embodiments of the present invention do not limit the shape of the first connection region 115, for example, it may be cylindrical or ring-shaped, as long as it can satisfy the condition of electrically connecting at least two first electrical connection ends 123.

As shown in FIG. 5b, in another embodiment of the present invention, the first connection region 115 is provided with concave portions matching the protrusions of the first electrical connection ends 123. Or, as shown in FIG. 5c, in yet another embodiment of the present invention, the first electrical connection ends 123 are disposed inside the transmitter case 121, and the first connection region 115 is provided with a corresponding protrusions or square bulges. Such these matching designs can improve the reliability of the electrical connection between the first electrical connection ends 123 and the first connection region 115. At the same time, the connection between theseis design also helps in fixing the position of the first connection region 115, that is, no matter what external force is applied to the detection device, the position of the first connection region 115 is always fixed without any displacement.

Preferably, in the embodiment of the present invention, the first connection region 115 is a first elastic connection region including an elastic rubber, at least one spring and the like. The first elastic connection region can further improve the reliability of the electrical connection between the connection region 115a and the first electrical connection ends 123. Compared with the rigid connection, the first elastic connection region can also used as a buffer to cushion the contact stress.

As shown in FIG. 5d, in one embodiment of the present invention, the first elastic connection region includes a conductive portion 115a and an insulation portion 115b that are arranged alternately. And when the transmitter 12 is assembled on the bottom case 10, at least two first electrical connection ends 123 electrically connected to the first connection region 115 share a common part of the conductive portion 115a. Here, the common part conductive portion may be the same conductive portion, such as 123a and 123b, 123a and 123c, or 123b and 123c all share the conductive portion 115a'. Alternatively, the common part conductive portion may refer to different conductive portions, such as 123b and 123c share the conductive portion 115a', while 123a and 123b share the conductive portions 115a" and 115a'.

Referring to FIG. 5a-FIG. 5d, when the transmitter 12 is assembled on the bottom case 10, the first electrical connection ends 123 and the conductive portion 115a are electrically connected, helping at least two first electrical connection ends 123 electrically conductive, making the transmitter 12 generate a signal and control the detection device to start or stop working. At the same time, the transmitter 12 is electrically connected to the sensor 113 when the intelligent detection device can start to work.

It should be noted that the embodiment of the present invention does not limit the electrical connection position between the transmitter 12 and the sensor 113. Preferably, in the embodiment of the present invention, the electrical connection position between the transmitter 12 and the sensor 113 is set near the position where the first electrical connection ends 123 and the first connection region 115 are connected, which can reduce the complexity of the internal structure and improve the integration of the internal structure of the intelligent detection device.

Preferably, in the embodiment of the present invention, the three electrically conductive first electrical connection ends 123a, 123b, and 123c cause a short circuit in the internal circuit, thereby causing the transmitter 12 to generate a signal. Therefore, the type of signal generated by the transmitter 12 is a short-circuit electrical signal. It is relatively simple to set up a short circuit in the internal circuit, thus reducing production cost.

In other embodiments of the present invention, the transmitter 12 may generate other types of signals, such as general closed-loop electrical signals, etc., which are not limited herein.

The signal generated by the transmitter 12 includes a start detecting signal or a stop detecting signal. The transmitter 12 is provided with an automatic identification module which is used to automatically control whether to start working according to the signal, making the detection device more intelligent.

Preferably, in the embodiment of the present invention, the signal generated by the transmitter 12 is a start detecting signal. That is, the signal generated by the transmitter 12 is used to activate the detecting function of the intelligent detection device (or make it start working). For example, when a new transmitter 12 or a charged transmitter 12 is assembled on the bottom case 10, the above-mentioned short-circuit electrical signal acts as a signal instruction for starting detection, making the detection device start working.

In another embodiment of the present invention, when an end-of-life transmitter 12 or a malfunction transmitter 12 is assembled on the bottom case 10, the above short-circuit electrical signal is used as another signal instruction to not activate the detection function (or not start working). Because based on the inaccurate data transmitted by the end-of-life or malfunction transmitter, the amount of the drugs infused into user body is neither accurate, bringing potential safety hazards to the user. Therefore, not activating the detection function can remind the user to replace a normal transmitter to eliminate potential safety hazards.

The presentation of the signal generated by the transmitter 12 is one or a combination of ordinary electrical signals, luminous signals, vibration signals, and sound signals. Here, the ordinary electrical signals refer to signals that do not have obvious forms such as light emission, vibration, or sound. At this time, a corresponding notification will appear on the interface of the remote device. When the signal is presented in a certain form, it is easier for the user to identify the content or instruction represented by the signal, therefore, the user can take timely countermeasures.

Preferably, in the embodiment of the present invention, the presentation of the signal is a combination of ordinary electrical signals, luminous signals, and sound signals. This combined signal facilitates user identification and confirmation. In another embodiment of the present invention, the signal combination further includes vibration signals.

In the embodiment of the present invention, the transmitter 12 can be reused, that is, the transmitter 12 rechargeable, which increases the service life of the transmitter 12 and saves the user's cost. Secondly, at least two first electrical connection ends 123 can be used not only for charging, but also for triggering signals, optimizing the structural design of the detection device.

Therefore, when the transmitter 12 is not assembled on the bottom case 10, two of the first electrical connection ends 123 (such as 123a and 123b) can be electrically connected to an external power source to charge the transmitter 12. When there are more than two first electrical connection ends 123, any two of them may be electrically connected to the external power source.

Figure 6A:
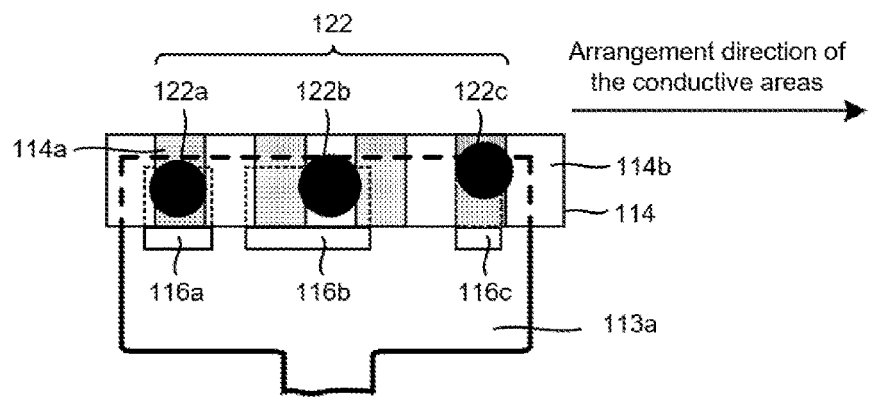
FIG. 6a-FIG. 6b are schematic diagrams of a second connection region, the third electrical connection ends, and the second electrical connection ends according to an embodiment of the present invention.
Figure 6B:
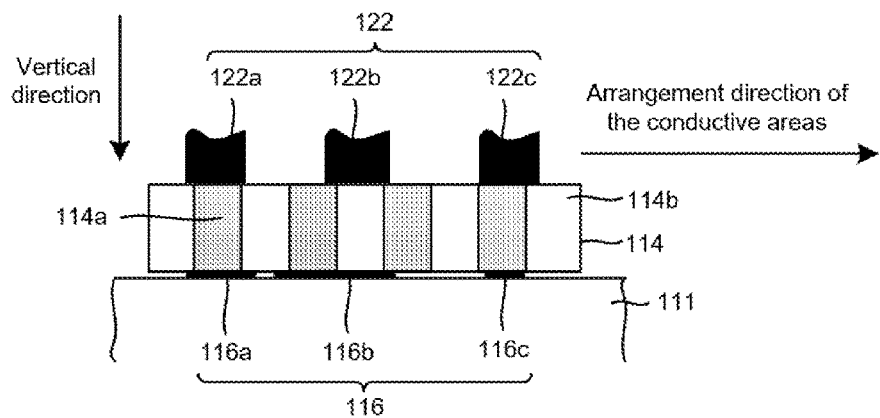
Figure 6C:
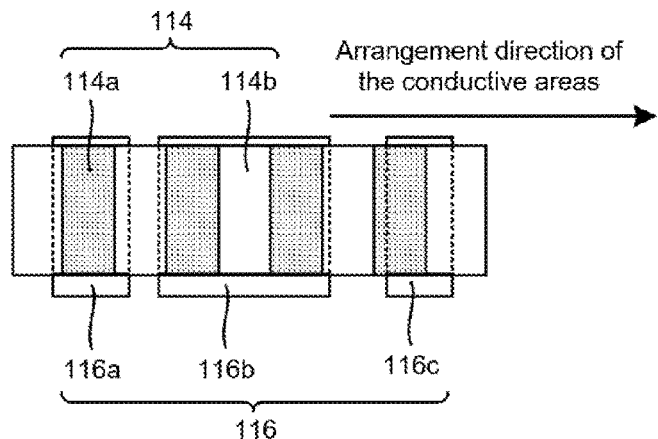
FIG. 6c is a top view of a second connection region and the third electrical connection ends according to another embodiment of the invention.
Figure 6D:
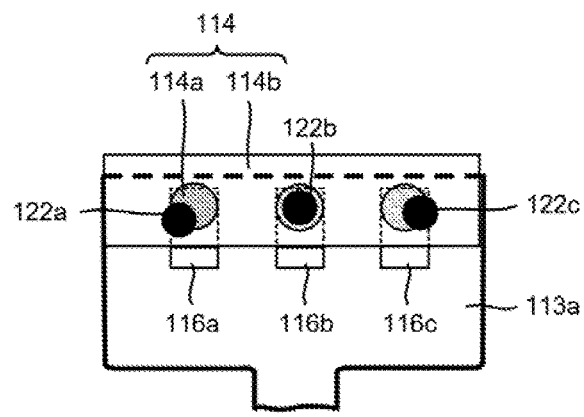
FIG. 6d-FIG. 6e are top views of a second connection region, the third electrical connection ends, and the second electrical connection ends according to different embodiments of the invention.
Figure 6E:
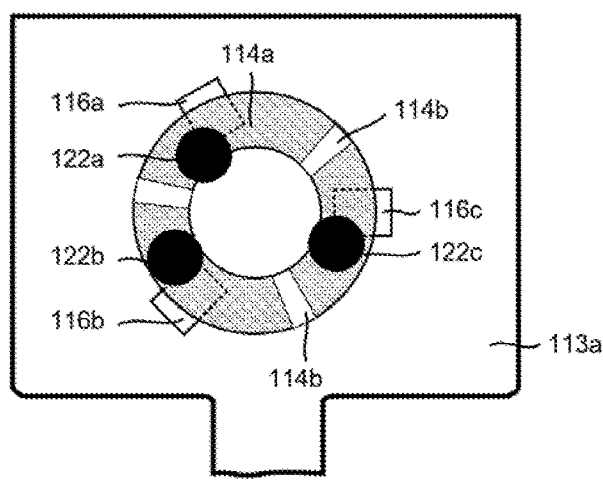

FIG. 6a is a top view of the second connection region, the third electrical connection ends, and the second electrical connection ends according to an embodiment of the present invention. FIG. 6b is a side view of the second connection region in FIG. 6a. FIG. 6c is a top view of a second connection region and third electrical connection ends according to another embodiment of the invention. FIG. 6d-FIG. 6e are top views of the second connection region, the third electrical connection ends, and the second electrical connection ends according to other different embodiments of the present invention.

Firstly, it should be pointed out that the thin dashed line in FIG. 6a represents the outline of part of the third electrical connection ends covered by the second connection region, while the thick dashed line represents the outline of part of the signal output portion covered by the second connection region. The thin dashed line and the thick dashed line in the subsequent drawings have the same meanings, which will not be repeated.

The second connection region 114 is disposed between the third electrical connection ends 116 and the second electrical connection ends 122 to achieve electrical connection between the two. Therefore, the second connection region 114 must include a conductive portion to electrically connect the corresponding third electrical connection ends 116 and the second electrical connection ends 122.

Therefore, the second connection region 114 includes at least two conductive areas 114a and at least one insulation area 114b. The conductive area 114a and the insulation area 114b are used to perform electrical conduction and electrical insulation, respectively. The conductive area 114a and the insulation area 114b cannot be separated from each other, that is, the conductive area 114a and the insulation area 114b belong to the whole part of the second connection region 114, respectively.

An insulation area 114b is provided between adjacent conductive areas 114a. The different third electrical connection ends 116 or the different second electrical connection ends 122 are electrically connected to the different conductive areas 114a, respectively, thus making any two third electrical connection ends 116 or any two second electrical connection ends 122 insulated from each other.

Inside the second connection region 114, the conductive area 114a and the insulation area 114b expand across the second connection region 114 in the vertical direction, as shown in FIG. 6b. Here, the vertical direction refers to the direction from the third electrical connection end 116 to the corresponding second electrical connection end 122, or the current direction between them. After the third electrical connection ends 116 and the second electrical connection ends 122 are electrically connected, such a design ensures that the second connection region 114 can only conduct electricity in the vertical direction, but not in the longitudinal direction. Therefore, the second connection region 114 is used for electrically connecting the third electrical connection end 116 and the corresponding second electrical connection end 122 while electrically insulating the different third electrical connection ends 116 or the different second electrical connection ends 122. The single second connection region 114 can perform electrical conduction and electrical insulation at the same time, thus reducing the complexity of the internal structure of the detection device, making the internal structure more compact, and improving the integration of the detection device.

It should be noted that in other embodiments of the present invention, the conductive area 114a or the insulation area 114b may also have a certain inclination, or be arranged inside the second connection region 114 in other directions or manners, which is not specifically limited herein, as long as the above-mentioned conditions of electrical conduction and electrical insulation are satisfied.

Referring to FIG. 2, FIG. 6a and FIG. 6b together, preferably, in the embodiment of the present invention, the second connection region 114 has a rectangular structure. The conductive area 114a and the insulation area 114b are arranged alternately and both penetrate the second connection region 114. In another embodiment of the present invention, different conductive areas 114a are arranged within the same insulation area 114b, that is, are surrounded by one single insulation area 114b as shown in FIG. 6d. In still another embodiment of the present invention, the top view of the second connection region 114 may be ring-shaped, as shown in FIG. 6e. In yet another embodiment of the present invention, the top view of the second connection region 114 may be round.

In other embodiments of the present invention, the second connection region 114 may have other shapes, which is not specifically limited herein, as long as the conditions for achieving the above-mentioned functions of the second connection region 114 can be satisfied.

Please continue to refer to FIG. 6a and FIG. 6b, when the second connection region 114 is electrically connected to the third electrical connection ends 116 and the second electrical connection ends 122 respectively, the insulation area 114b is located between any two third electrical connection ends 116 which are connected to the second connection region 114. Preferably, in the embodiment of the present invention, the insulation area 114b spaced between any two third electrical connection ends 116 includes a portion of an insulation area 114b (as between 116a and 116b shown in FIG. 6a and FIG. 6b), or one insulation area 114b, or more than one insulation area 114b (as between 116c and 116b in FIG. 6a and FIG. 6b). Similarly, the insulation area 114b spaced between any two second electrical connection ends 122 connected to the second connection region 114 includes a portion of one insulation area 114b, or one insulation area 114b, or more than one insulation area 114b. However, it is obvious that the third electrical connection end and the corresponding second electrical connection end (such as between 116a and 122a, 116b and 122b, or 116c and 122c) share a common part of the conductive area 114a to achieve the electrical conductivity. The common part of the conductive area includes a portion of one conductive area 114a (as between 116c and 122c in FIG. 6a and FIG. 6b), or one conductive area 114a, or more than one conductive area 114a.

Referring to FIG. 6a and FIG. 6b, those skilled in the art can easily understand that the above-mentioned part of one insulation area or conductive area, one insulation area or conductive area, and more than one insulation area or conductive area only represents the span range of the third electrical connection end or the second electrical connection end in one dimension in the drawings (such as the arrangement direction of the conductive areas).

In other embodiments of the present invention, a portion of one insulation area or one conductive area, one insulation area or one conductive area, and more than one insulation area or conductive area may also represent the range in the two-dimensional direction which is covered by the third electrical connection ends or the second electrical connection ends, as shown in FIG. 6c. Taking the third electrical connection ends as an example, the dotted line in FIG. 6c represents a partial outline of the third electrical connection ends. Obviously, one third electrical connection end 116 can cover a part of one insulation area or one conductive area, or one insulation area or one conductive area, or more than one insulation area or conductive area.

Obviously, when the number of conductive areas or insulation areas between the above structures is large or the range is wide, the reliability of the electrical connection or electrical insulation between the structures will be significantly improved.

In the embodiment of the present invention, the second connection region 114 is an elastic second connection region whose material includes elastic plastic, elastic rubber, and the like. The elastic second connection region 114 can obtain better electrical contact while acting as a buffer at the same time. When the material of the second connection region 114 is elastic rubber, the second connection region 114 is a conductive rubber strip which not only performs conduction and insulation, but also works as a buffer.

Obviously, when the sensor 113 is a two-electrode system, the number of the third electrical connection ends and the second electrical connection ends are both two. At this time, the second connection region 114 only needs to include two conductive areas 114a and one insulation area 114b disposed between the two conductive areas 114a. That is, two pairs of different third electrical connection ends and second electrical connection ends are electrically connected through different conductive areas 114a, respectively, to achieve electrical conduction. At the same time, the two third electrical connection ends or the two second electrical connection ends are separated by the insulation area to achieve electrical insulation.

Figure 7:
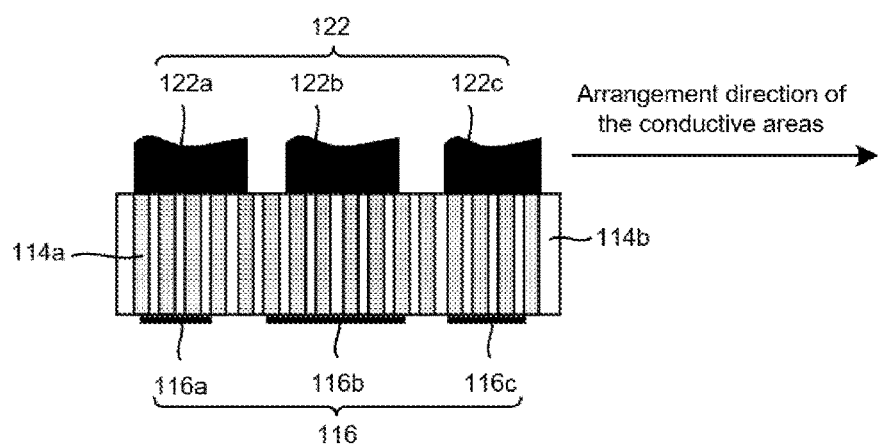
FIG. 7 is a schematic diagram of a second connection region, the third electrical connection ends, and the second electrical connection ends according to still another embodiment of the invention.

Sensors, in other embodiments of the present invention, may also include more electrodes. Therefore, the second connection region 114 includes more conductive areas and insulation areas that are arranged alternately, which makes the electrical connection method more flexible, as shown in FIG. 7.

It should be noted that, in other embodiments of the present invention, the sensor includes at least three electrodes, that is, the signal output portion 113a is provided with at least three third electrical connection ends. And at least two of the third electrical connection ends, through different electrical conductive area 114a, are electrically connected to the corresponding second electrical connection ends, of which the connection method and principle are the same as above. In terms of other third electrical connection ends and second electrical connection ends that are not connected to the second connection region 114, the embodiments of the present invention do not limit their connection manner or connection principle. As in an embodiment of the present invention, the sensor is a three-electrode system, in which only the working electrode and the counter electrode are electrically connected to the second electrical connection ends by the corresponding third electrical connection ends through the above-mentioned second connection region, while the reference electrode is connected to the transmitter in other methods.

Figure 8A:
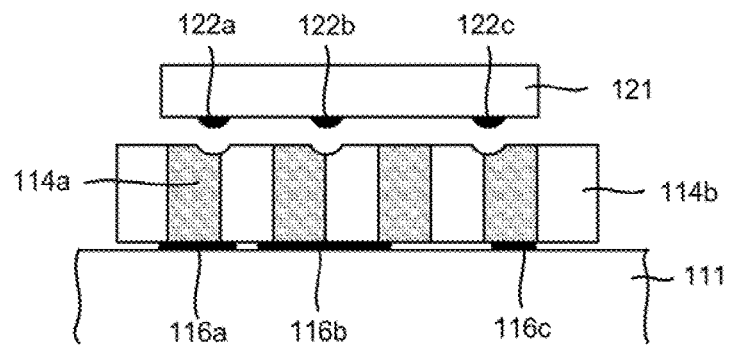
FIG. 8a-FIG. 8b are schematic diagrams of the electrical connection position between the second electrical connection ends and the second connection region according to different embodiments of the present invention.
Figure 8B:
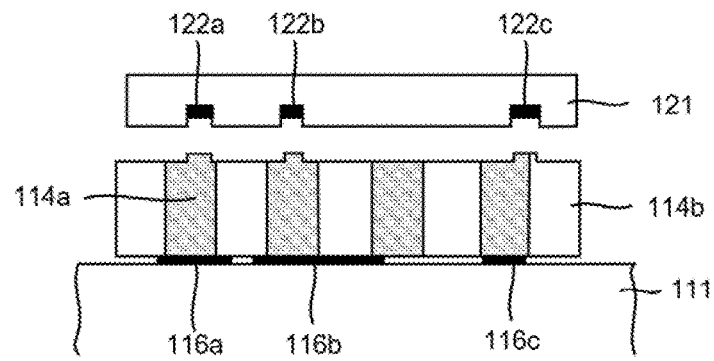

FIG. 8a-FIG. 8b are schematic diagrams of the electrical connection position between the second electrical connection ends 122 and the second connection region 114 in different embodiments of the present invention.

For ease of labeling and description, the second electrical connection ends 122 and the second connection region 114 in FIG. 8a and FIG. 8b will be shown separately.

As shown in FIG. 8a, in the embodiment of the present invention, the second electrical connection ends 122 are protruding metal contact pins with spherical top. Correspondingly, the second connection region 114 is provided with concave portions (not labeled) at the positions where it is connected to the protruding metal contact pins to improve contact and connection. At the same time, the connection between these protruding pins and the concave portions also helps in fixing the position of the second connection region 114, that is, no matter what external force is applied to the detection device, the position of the second connection region 114 is always fixed without any displacement, ensuring that the second connection region 114 performs normally.

It should be noted that if the second connection region 114 is an elastic second connection region, the second connection region 114 may not include concave portions. When pressed by the protruding metal contact pins, concave portions will be formed on the surface of the elastic second connection region to match the metal contact pins, ensuring the function of electrical connection or electrical insulation.

As shown in FIG. 8b, in another embodiment of the present invention, the second electrical connection ends 122 are disposed inside the transmitter 12. At this time, the second connection region 114 is correspondingly provided with protrusions or square bulges (not labeled), which can enter the interior of the transmitter 12 and be electrically connected to the corresponding second electrical connection ends 122.

Figure 9A:
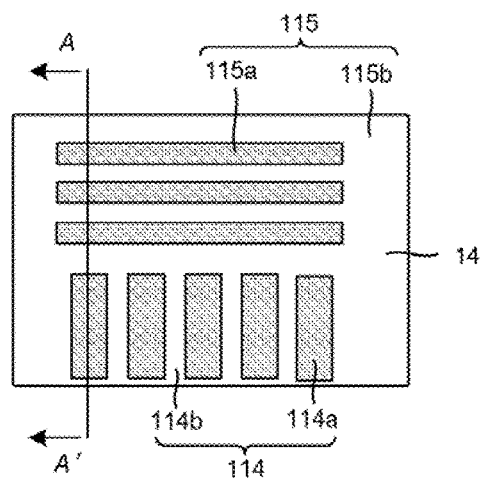
FIG. 9a-FIG. 9b are schematic diagrams of a connection member according to yet another embodiment of the present invention.
Figure 9B:
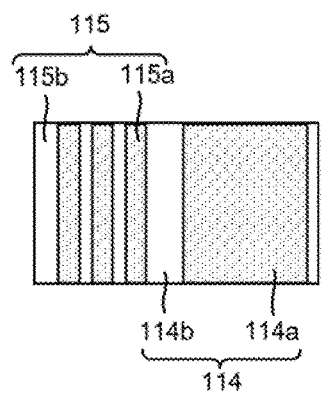
Figure 9C:
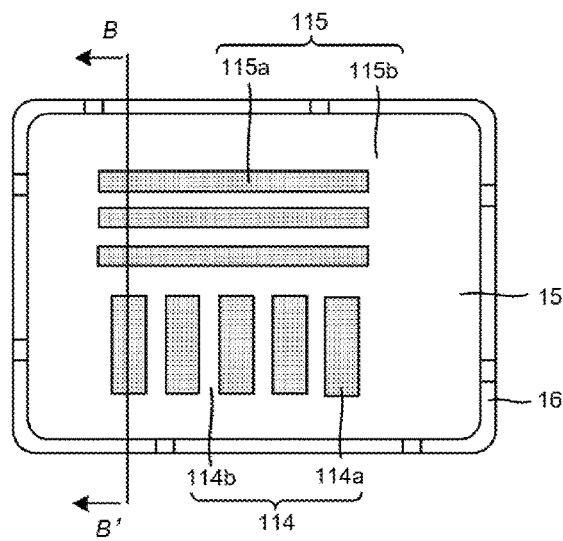
FIG. 9c-FIG. 9d are schematic diagrams of an elastic connection member according to yet another embodiment of the present invention.
Figure 9D:
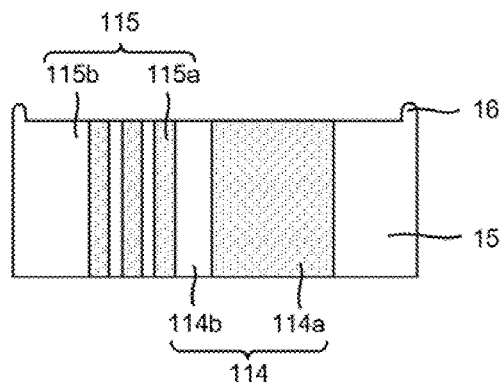

FIG. 9a-FIG. 9b are schematic diagrams of the connection member 14 according to an embodiment of the present invention. FIG. 9b is a cross-sectional view taken along section line A-A' in FIG. 9a. FIG. 9c-FIG. 9d are schematic diagrams of an elastic connection member 15 according to an embodiment of the invention. FIG. 9d is a cross-sectional view taken along section line B-B' in FIG. 9c.

In one embodiment of the present invention, the first connection region 115 and the second connection region 114 are disposed in the same connection member 14. As described above, the first connection region 115 and the second connection region 114 correspond to the first electrical connection ends 123 and the second electrical connection ends 122, respectively. Obviously, in other embodiments of the present invention, the connection member 14 may be an elastic connection member.

As shown in FIG. 9c-FIG. 9d, the elastic connection member 15 includes the first connection region 115 and the second connection region 114, that is, the first connection region 115 and the second connection region 114 are the first elastic connection region and the second elastic connection region, respectively. At the same time, the elastic connection member 15 itself is used as a seal. The elastic connection member 15 surrounds the positions where the first connection region 115 and the second connection region 114 electrically connect with the first electrical connection ends 123 and the second electrical connection ends 122, respectively, and functions as dust-proof, moisture-proof, water-proof, etc. In order to achieve a better sealing effect, convex portion 16 is also provided around the elastic connection member 15. Obviously, the insulation area 114b and the insulation portion 115b of the connection member are the same structure and play the same role.

It should be noted that an embodiment of the present invention may also be provided with an additional seal 130, referring to FIG. 2 and FIG. 4. The seal 130 surrounds the above-mentioned electrical connection positions. The bottom case 10 or the transmitter 12 is provided with a groove 131 (as shown in FIG. 2) for placing the seal 130 to achieve a better sealing effect.

It should be noted that, in other embodiments of the present invention, after the transmitter 12 is assembled, if the transmitter 12 and the bottom case 10 themselves are well sealed, the seal 130 may not be provided in the detection device.

Figure 10A:
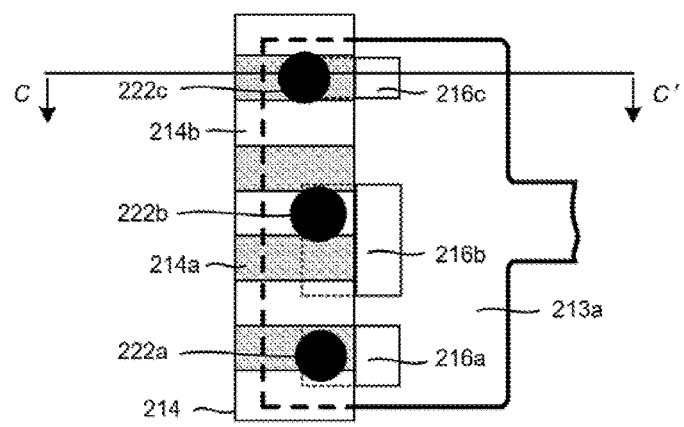
FIG. 10a-FIG. 10b are schematic diagrams of the electrical connection among the second connection region, the third electrical connection ends and the second electrical connection ends according to yet another embodiment of the present invention.
Figure 10B:
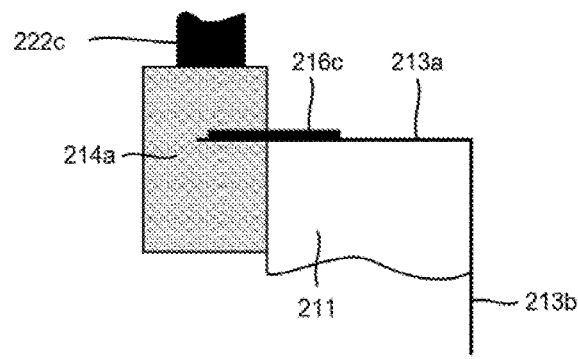

FIG. 10a-FIG. 10b are schematic diagrams of the electrical connection among the second connection region 214, the third electrical connection ends and the second electrical connection ends according to another embodiment of the present invention. FIG. 10a is a top view. FIG. 10b is a cross-sectional view taken along the section line C-C' in FIG. 10a.

The three second electrical connection ends 222a, 222b, and 222c of the embodiment of the present invention are electrically connected to the three third electrical connection ends 216a, 216b, and 216c, respectively. The arrangement of the conductive areas 214a and the insulation areas 214b in the second connection region 214 is the same as mentioned above.

Preferably, according to FIG. 10b, in the embodiment of the present invention, the signal output portion 213a is embedded in the second connection region 214. Therefore, the three third electrical connection ends 216a, 216b, and 216c are all embedded in the second connection region 214. In order to fix the position of the sensor, the signal output portion 213a and the detection portion 231b are carried by the auxiliary assembly structure 211.

In this embodiment of the present invention, the principle and method of electrical connection between the second connection region 214 and the third electrical connection ends or the second electrical connection ends are the same as described above.

Figure 11A:
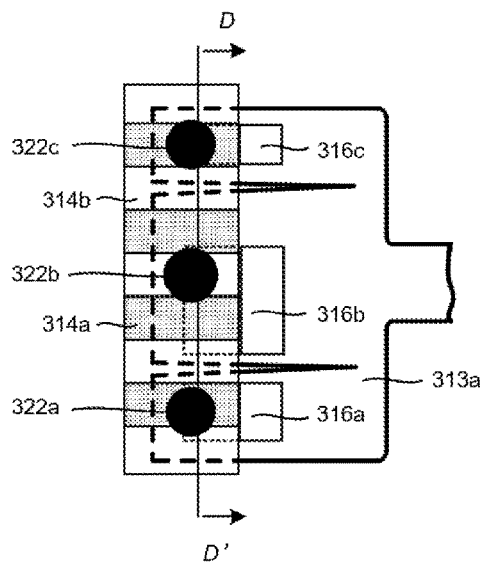
FIG. 11a-FIG. 11b are schematic diagrams of the electrical connection among the second connection region, the third electrical connection ends and the second electrical connection ends according to yet another embodiment of the present invention.
Figure 11B:
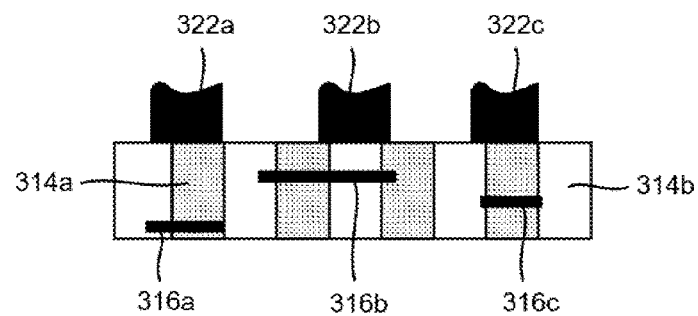

FIG. 11a-FIG. 11b are schematic diagrams of the electrical connection among the second connection region, the third electrical connection ends and the second electrical connection ends according to yet another embodiment of the present invention. FIG. 11a is a top view. FIG. 11b is a cross-sectional view taken along the section line D-D' in FIG. 11a.

In the embodiment of the present invention, the three third electrical connection ends 322a, 322b, and 322c of the signal output portion 313a are independent of each other and do not interfere with each other. The three third electrical connection ends are all embedded in the conductive area 314a and/or the insulation area 314b of the second connection region. As shown in FIG. 11b, in the embodiment of the present invention, the embedding heights of the third electrical connection ends in the second connection region are not exactly the same.

In the actual manufacturing process, the thickness of each third electrical connection end will be different. When the transmitter and the sensor are connected, the independent and non-interfering third electrical connection ends can reduce or eliminate the effect of poor contact caused by the above-mentioned thickness difference, improving the reliability of the electrical connection between the three. Preferably, if the second connection region is an elastic second connection region, the above-mentioned problem of poor contact can be effectively avoided.

Obviously, in other embodiments of the present invention, it is possible that only two out of the three third electrical connection ends are embedded in the second connection region, while the third one is not embedded, which is not specifically limited herein.

Figure 12A:
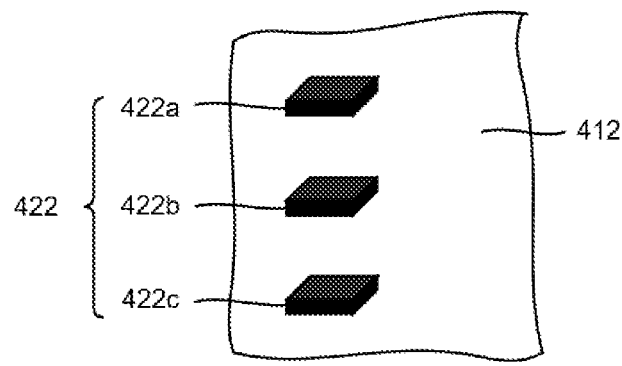
FIG. 12a is a schematic diagram of the second electrical connection ends according to yet another embodiment of the present invention.
Figure 12B:
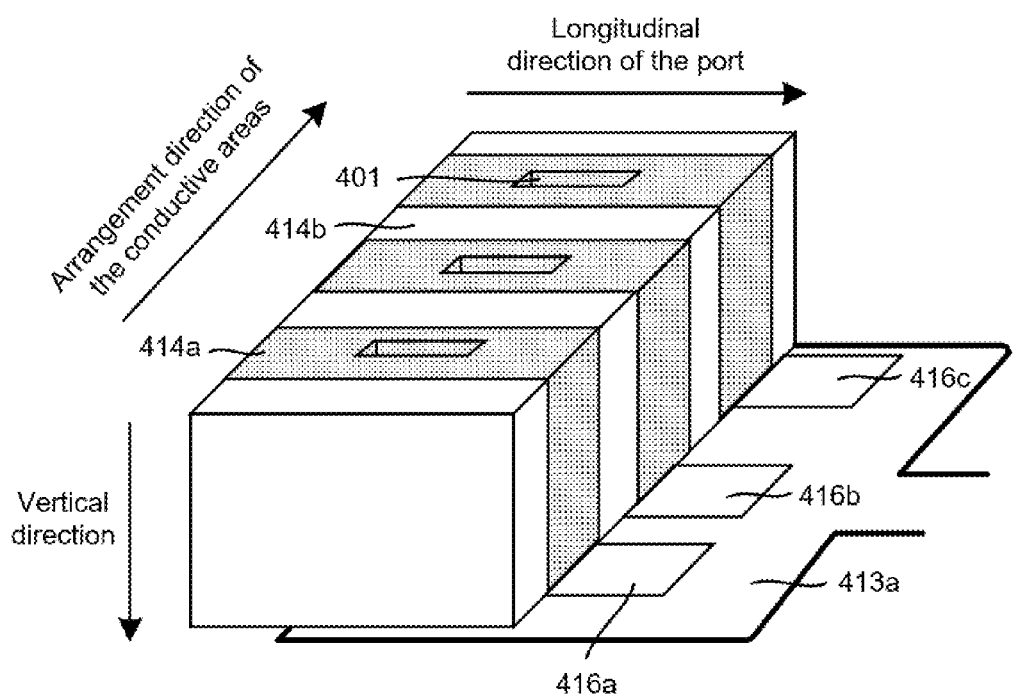

FIG. 12a is a schematic diagram of the second electrical connection ends 422 according to yet another embodiment of the present invention. FIG. 12b is schematic diagram of the second connection region and the signal output end 413a matched with the second electrical connection ends 422 in FIG. 12a.

The three second electrical connection ends 422a, 422b, and 422c are plugs that protrude from the transmitter case 412. The type of plugs is as described above. Three ports 401 are provided in the second connection region to cooperate with the three second electrical connection ends. The three second electrical connection ends can be respectively inserted into corresponding ports 401.

In the embodiment of the present invention, the longitudinal direction of the port 401 is perpendicular to the arrangement direction of the conductive areas 414a or the insulation areas 414b. In other embodiments of the present invention, the two directions can be flexibly designed according to requirements. As in one embodiment of the present invention, the longitudinal direction of the port is parallel to the arrangement direction of the conductive areas. The principle and method of electrical connection is the same as mentioned above.

In the detection device of prior art, multiple separated conductive components and/or multiple separated insulation components are provided between the transmitter and the sensor, and one component has only one single function, which increases the complexity of the internal structure of the detection device. At the same time, the reliability of the electrical connection between the transmitter and the sensor is poor, which is prone to signal interruption and data loss. And the detection device is not intelligent enough.

In the detection device of the embodiment of the present invention, a second connection region that simultaneously performs conduction and insulation functions is provided between the transmitter and the sensor, which reduces the complexity of the internal structure of the detection device, makes the internal structure of the detection device more compact, and improves the integration of the detection device. At the same time, the electrical conduction of at least two first electrical connection ends triggers a signal of the transmitter to intelligently control the detection device to work.

In summary, the present invention discloses a highly integrated intelligent analyte detection device, in which a second connection region that simultaneously performs conduction and insulation functions is provided between the transmitter and the sensor, reducing the complexity of the internal structure of the detection device, making the internal structure of the device more compact, improving the integration of the detection device, and greatly enhancing the user experience. At the same time, the electrical conduction of at least two first electrical connection ends triggers a signal of the transmitter to intelligently control the detection device to work.

While the invention has been described in detail with reference to the specific embodiments of the present invention, it should be understood that it will be appreciated by those skilled in the art that the above embodiments may be modified without departing from the scope and spirit of the invention. The scope of the invention is defined by the appended claims.

The invention claimed is:

1. A highly integrated intelligent analyte detection device, comprising:
    a bottom case, wherein a first connection region comprising a conductive portion is disposed on the bottom case;
    a transmitter comprising a transmitter case and an internal circuit, wherein the internal circuit, arranged in the transmitter case, comprises at least two second electrical connection ends and at least two first electrical connection ends which are insulated from each other and correspond to the first connection region, and through electrical connection with the first connection region, the at least two first electrical connection ends are electrically conductive, and the transmitter triggers a signal;
    a sensor, assembled on the bottom case, wherein the sensor comprises a signal output portion and a detection portion, and the signal output portion is provided with at least two third electrical connection ends corresponding to the second electrical connection ends; and
    a second connection region, arranged between the third electrical connection ends and the second electrical connection ends, wherein the second connection region comprises at least two conductive areas and at least one insulation area which cannot be separated from each other, and the insulation area is provided between two adjacent conductive areas of the at least two conductive areas, and the at least two third electrical connection ends, through different conductive areas of the at least two conductive areas, are respectively electrically connected to corresponding second electrical connection ends of the second electrical connection ends, and the third electrical connection ends or the second electrical connection ends are respectively electrically connected to the different conductive areas,
    wherein when the transmitter is assembled to the bottom case, a short circuit occurs in the internal circuit, generating a short-circuit electrical signal as a type of the signal generated by the transmitter, and wherein the at least two first electrical connection ends are conductive to each other.

2. The highly integrated intelligent analyte detection device of claim 1, wherein
    the first electrical connection ends or the second electrical connection ends are metal contact pins.

3. The highly integrated intelligent analyte detection device of claim 2, wherein
    the first electrical connection ends or the second electrical connection ends are protruding metal contact pins with spherical tops.

4. The highly integrated intelligent analyte detection device of claim 3, wherein
    the first connection region or the second connection region is provided with concave portions that correspondingly cooperate with the spherical tops of the protruding metal contact pins.

5. The highly integrated intelligent analyte detection device of claim 2, wherein
    the first electrical connection ends or the second electrical connection ends are provided inside the transmitter, and the first connection region is provided with protrusions that cooperate with the first electrical connection ends, or the second connection region is provided with protrusions that cooperate with the second electrical connection ends.

6. The highly integrated intelligent analyte detection device of claim 1, wherein
the second electrical connection ends are protruding plugs.

7. The highly integrated intelligent analyte detection device of claim 6, wherein
the second connection region is provided with ports that cooperate with the protruding plugs.

8. The highly integrated intelligent analyte detection device of claim 1, wherein
the conductive area and the insulation area expand across the second connection region in a vertical direction, respectively.

9. The highly integrated intelligent analyte detection device of claim 1, wherein
the third electrical connection ends and the corresponding second electrical connection ends share a common part of the conductive areas.

10. The highly integrated intelligent analyte detection device of claim 9, wherein
the common part of the conductive areas comprises a portion of one of the conductive areas, or one of the conductive areas, or some of the conductive areas.

11. The highly integrated intelligent analyte detection device of claim 1, wherein
the insulation area is spaced between any two of the third electrical connection ends or any two of the second electrical connection ends connected to the second connection region, the at least one insulation area comprises insulation areas, and the insulation area comprises a portion of one of the insulation areas, or one of the insulation areas, or some of the insulation areas.

12. The highly integrated intelligent analyte detection device of claim 1, wherein
the signal comprises a start detecting signal or a stop detecting signal.

13. The highly integrated intelligent analyte detection device of claim 1, wherein
a presentation of the signal is one or a combination of electrical signals resulting in a corresponding notification on an interface of a remote device as luminous signals, vibration signals, and/or sound signals.

14. The highly integrated intelligent analyte detection device of claim 1, wherein
when the transmitter is not assembled on the bottom case, the at least two first electrical connection ends are configured to be capable of being electrically connected to an external power source to charge the transmitter.

15. The highly integrated intelligent analyte detection device of claim 1, wherein
the first connection region is a first elastic connection region, or the second connection region is a second elastic connection region.

16. The highly integrated intelligent analyte detection device of claim 15, wherein
the first connection region and the second connection region are disposed in a connection member.

17. The highly integrated intelligent analyte detection device of claim 16, wherein
the connection member is an elastic connection member surrounding positions where the first elastic connection region and the first electrical connection ends are electrically connected, or surrounding positions where the second elastic connection region connects with the second electrical connection ends and the third electrical connection ends, respectively.

18. The highly integrated intelligent analyte detection device of claim 15, wherein
the third electrical connection ends are embedded inside the second connection region.

19. The highly integrated intelligent analyte detection device of claim 18, wherein
the third electrical connection ends are independent of each other and do not interfere with each other, and embedding heights of the third electrical connection ends in the second connection region are not exactly the same.

20. The highly integrated intelligent analyte detection device of claim 1, wherein
the insulation portion is also included in the first connection region, and the insulation portion and the conductive portion are arranged alternately.

21. The highly integrated intelligent analyte detection device of claim 20, wherein
the at least two first electrical connection ends connected with the conductive portion share a common part of the conductive portion.

* * * * *